United States Patent
Asada et al.

(10) Patent No.: US 8,111,365 B2
(45) Date of Patent: Feb. 7, 2012

(54) LIQUID CRYSTAL DISPLAY DEVICE

(75) Inventors: Satoshi Asada, Kanazawa (JP); Kazuyuki Harada, Ishikawa (JP); Junichi Kobayashi, Nomi-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 55 days.

(21) Appl. No.: 11/806,368

(22) Filed: May 31, 2007

(65) Prior Publication Data

US 2007/0291212 A1  Dec. 20, 2007

(30) Foreign Application Priority Data

Jun. 19, 2006  (JP) ................. 2006-168771

(51) Int. Cl.
*G02F 1/1343* (2006.01)
(52) U.S. Cl. ..................... 349/142; 349/110
(58) Field of Classification Search ............ 349/46–48, 349/106–110, 142–143
See application file for complete search history.

(56) References Cited

U.S. PATENT DOCUMENTS

| | | | |
|---|---|---|---|
| 5,610,739 A | | 3/1997 | Uno et al. |
| 7,701,526 B2 * | | 4/2010 | Kim ............................ 349/54 |
| 2005/0164434 A1 * | | 7/2005 | Arakawa et al. ............ 438/149 |
| 2005/0275770 A1 * | | 12/2005 | Kubota et al. ................. 349/110 |

FOREIGN PATENT DOCUMENTS

| | | |
|---|---|---|
| JP | 58-96589 | 6/1983 |
| JP | 5-241153 | 9/1993 |
| JP | 11-109404 | 4/1999 |
| JP | 2002-156653 | 5/2002 |
| JP | 2002-357828 | 12/2002 |
| JP | 2003-43512 | 2/2003 |
| JP | 2005-352209 | 12/2005 |

OTHER PUBLICATIONS

Notification of Reasons for Rejection mailed Sep. 30, 2008, from the Japanese Patent Office in counterpart Japanese Application No. 2006-168771.
Notification of Reasons for Rejection mailed Jun. 17, 2008, from the Japanese Patent Office in counterpart Japanese Application No. 2006-168771.
A Notification of Reasons for Rejection mailed on Mar. 10, 2009, from the Japanese Patent Office in counterpart Japanese Application No. 2006-168771, and an English-language translation thereof.

* cited by examiner

*Primary Examiner* — Frank G Font
*Assistant Examiner* — Eric Wong
(74) *Attorney, Agent, or Firm* — Finnegan, Henderson, Farabow, Garrett & Dunner, L.L.P.

(57) ABSTRACT

A liquid crystal display device includes an active area which is composed of pixels arrayed in a matrix, and a light-shield area surrounding the active area. The liquid crystal display device includes a first substrate including pixel electrodes disposed in the respective pixels, a second substrate including color filters disposed in the respective pixels, and a counter-electrode which is disposed to cover the color filters and extends from the active area to at least a part of the light-shield area, and a liquid crystal layer held between the first substrate and the second substrate. The pixel electrode and the color filter of the pixel, which is disposed at an end portion of the active area, extend into the light-shield area beyond a boundary between the active area and the light-shield area.

3 Claims, 5 Drawing Sheets

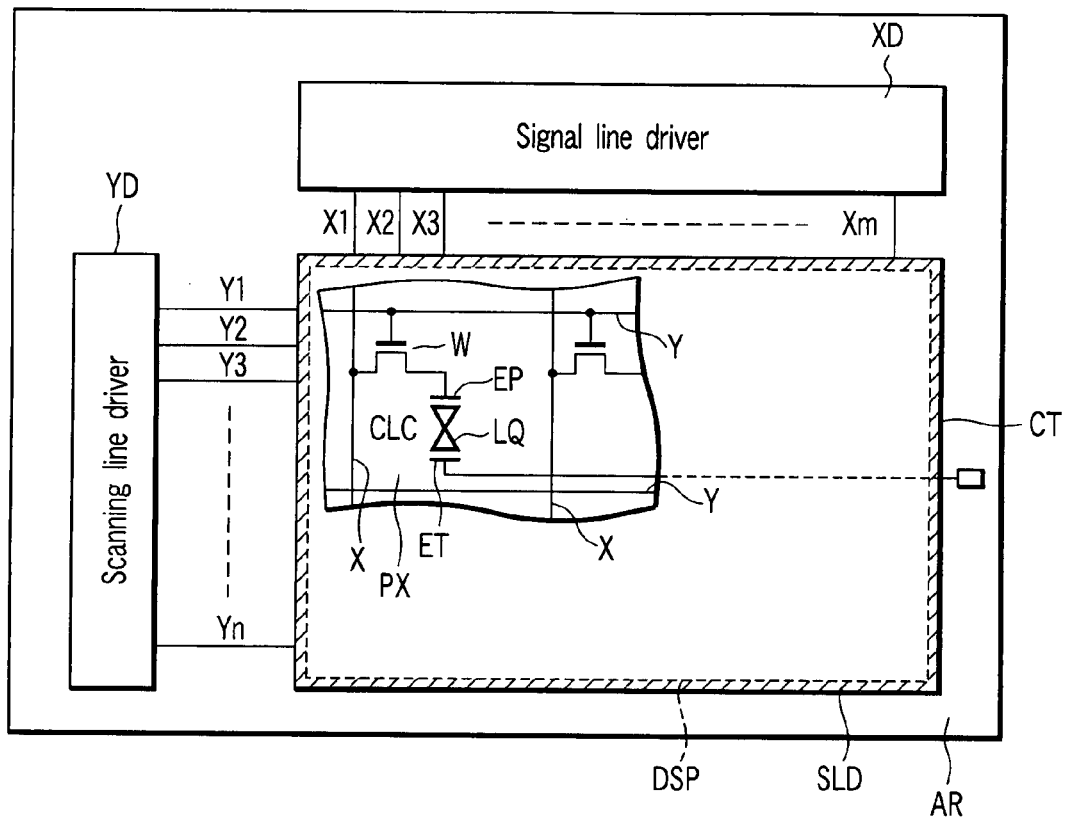
F I G. 1
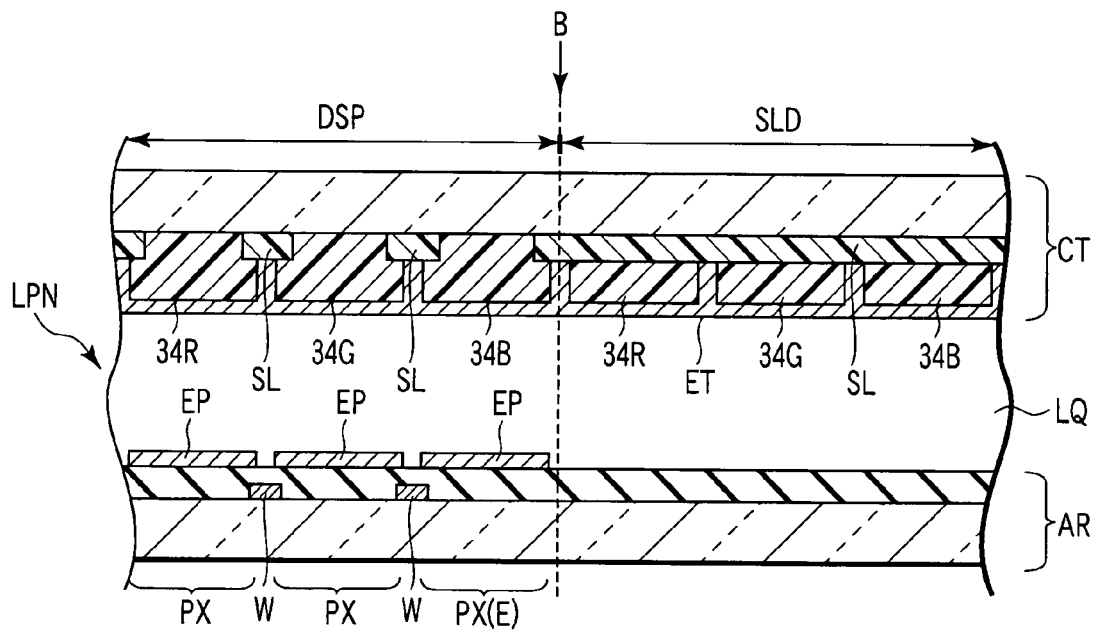
F I G. 3

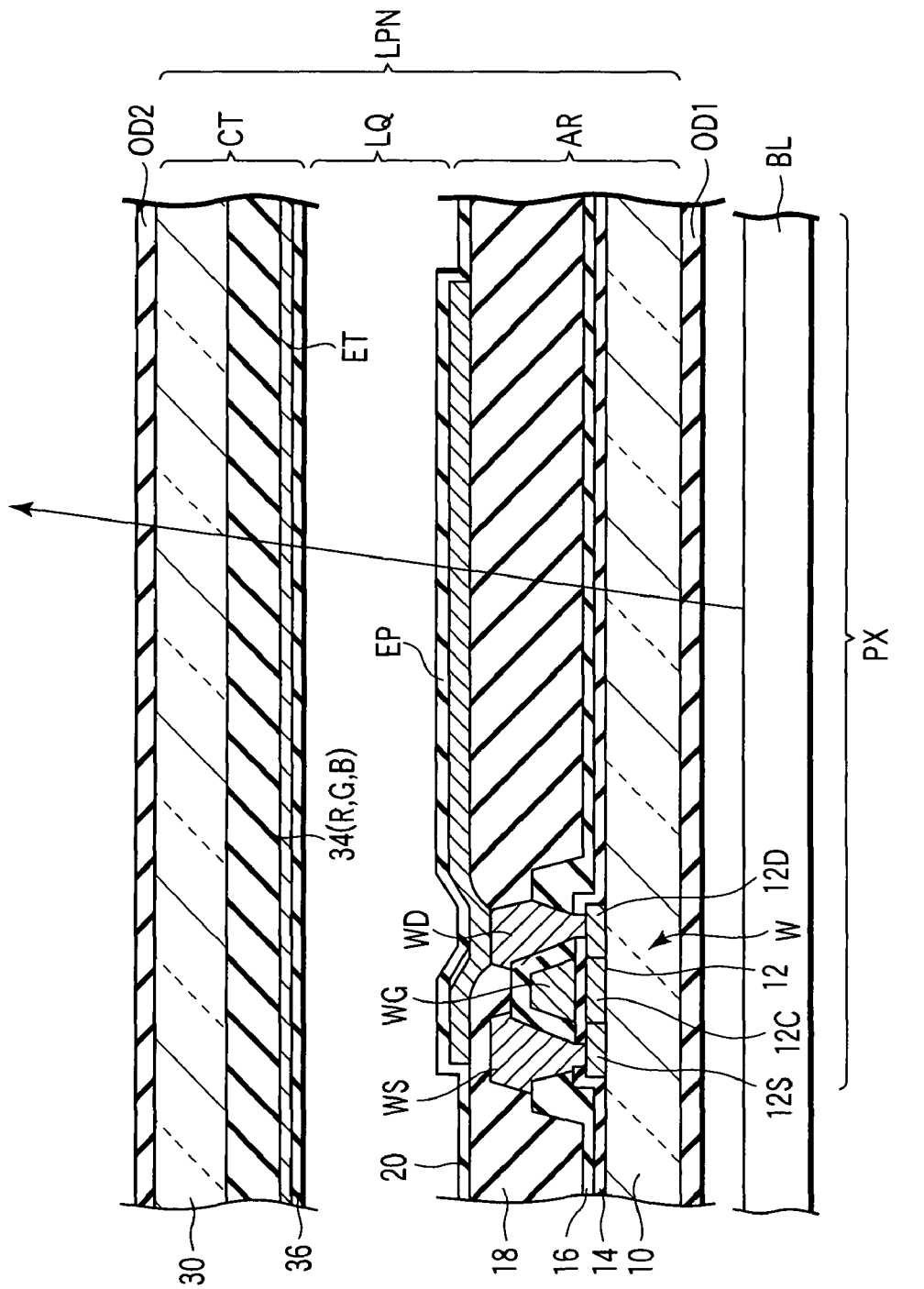
F I G. 2

LIQUID CRYSTAL DISPLAY DEVICE

CROSS-REFERENCE TO RELATED APPLICATIONS

This application is based upon and claims the benefit of priority from prior Japanese Patent Application No. 2006-168771, filed Jun. 19, 2006, the entire contents of which are incorporated herein by reference.

BACKGROUND OF THE INVENTION

1. Field of the Invention

The present invention relates generally to a liquid crystal display device, and more particularly to a liquid crystal display device having a transmissive display function of displaying an image by selectively passing backlight.

2. Description of the Related Art

A liquid crystal display device having a transmissive display function includes a transmissive liquid crystal display panel and a backlight unit which illuminates the liquid crystal display panel from the back side thereof. The liquid crystal display panel is configured such that a liquid crystal layer is held between a pair of substrates. The liquid crystal display panel has an active area for displaying an image and a light-shield area which surrounds the active area.

In a color-display-type liquid crystal display device, each of pixels which constitute the active area includes a pixel electrode and a color filter. The color filters of the respective pixels are disposed spaced apart from one another, for example, in order to prevent occurrence of non-uniformity in gap of the liquid crystal layer due to irregularities which are formed by overlapping of the color filters. Thus, a light-shield layer (black matrix) is disposed between the pixels in the active area, as in the light-shield area. In the light-shield area, color filters are disposed, as in the active area, for example, in order to secure the same gap as in the active area. A counter-electrode is so disposed as to cover the color filters, and the counter-electrode extends not only over the active area but also over the outside of the active area (i.e. over the light-shield area) in consideration of misalignment in attachment between the substrates.

In the liquid crystal display device having the above-described structure, when a voltage is applied to the liquid crystal layer, a vertical electric field is generated substantially in a normal direction to the liquid crystal display panel between the pixel electrode of each pixel and the counter-electrode. At this time, the pixels that are disposed at end portions of the active area suffer the influence of an oblique electric field, which is generated aside from the vertical electric field. Specifically, an oblique electric field, which is inclined with respect to the normal line of the liquid crystal display panel, is generated between the counter-electrode, which covers the active-area-side end faces of the color filters disposed on the light-shield area, and the pixel electrodes disposed at end portions of the active area.

There is a concern that a defect in alignment of liquid crystal molecules in the liquid crystal layer may occur in the pixels at the end portions of the active area due to interactions between the oblique electric field and the vertical electric field. In the transmissive liquid crystal display panel, such a defect in alignment causes so-called "light leakage", by which backlight passes through the liquid crystal layer regardless of the voltage that is applied to the liquid crystal layer.

Jpn. Pat. Appln. KOKAI Publication No. 2002-357828 (Patent Document), for instance, discloses a technique in which a surface stepped-portion in each pixel is set at less than 1.9 μm, or the angle between an oblique part of the surface stepped-portion in each pixel and the surface of the display area is set at 10° or less, thereby to improve the defect in alignment of liquid crystal molecules (or abnormality in alignment).

According to the above-described Patent Document, consideration is given to the surface stepped-portion that is formed when the color filters of neighboring pixels are overlapped in the liquid crystal display device of the color filter on array (COA) configuration. Thus, it is still difficult to prevent light leakage due to a defect in alignment in pixels at end portions of the active area.

BRIEF SUMMARY OF THE INVENTION

The present invention has been made in consideration of the above-described problem, and the object of the invention is to provide a liquid crystal display device with good display quality.

According to a first aspect of the present invention, there is provided a liquid crystal display device including an active area which is composed of pixels arrayed in a matrix, and a light-shield area surrounding the active area, comprising: a first substrate including pixel electrodes disposed in the respective pixels; a second substrate including color filters disposed in the respective pixels, and a counter-electrode which is disposed to cover the color filters and extends from the active area to at least a part of the light-shield area; and a liquid crystal layer held between the first substrate and the second substrate, wherein the pixel electrode and the color filter of the pixel, which is disposed at an end portion of the active area, extend into the light-shield area beyond a boundary between the active area and the light-shield area.

According to a second aspect of the invention, there is provided a liquid crystal display device including an active area which is composed of pixels arrayed in a matrix, and a light-shield area surrounding the active area, comprising: a first substrate including pixel electrodes disposed in the respective pixels, and a dummy pixel electrode disposed in the light-shield area; a second substrate including color filters disposed in the respective pixels, and a counter-electrode which is disposed to cover the color filters and which is opposed to the pixel electrodes of the active area and the dummy pixel electrode of the light-shield area; and a liquid crystal layer held between the first substrate and the second substrate.

The present invention can provide a liquid crystal display device with good display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 schematically shows the structure of a liquid crystal display device according to an embodiment of the present invention;

FIG. 2 schematically shows the cross-sectional structure of the liquid crystal display device shown in FIG. 1;

FIG. 3 is a cross-sectional view that schematically shows an example of the structure in which light leakage occurs in a peripheral region of an active area in the liquid crystal display device shown in FIG. 1;

DETAILED DESCRIPTION OF THE INVENTION

Figure 4:
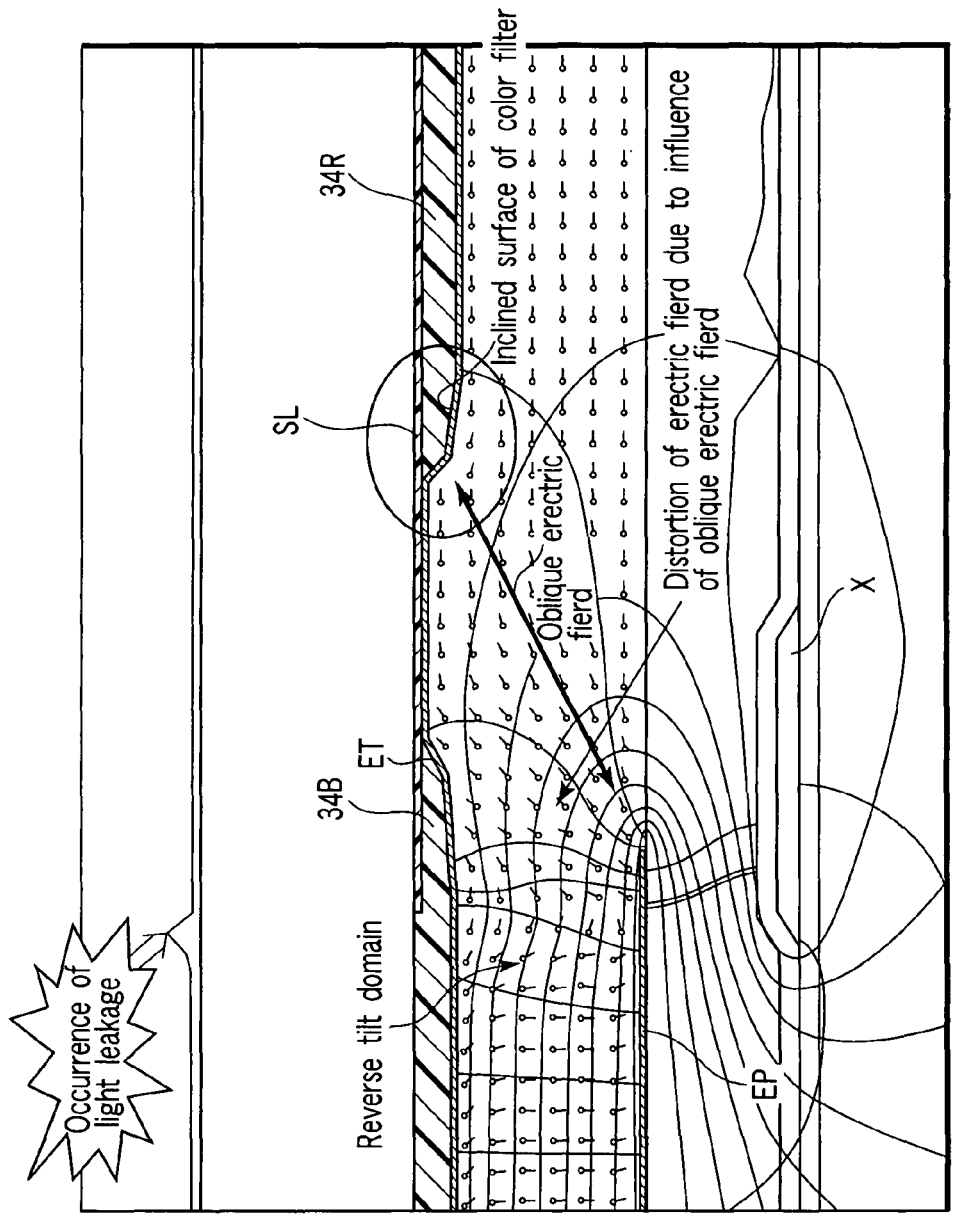
FIG. 4 is a view for explaining the mechanism of occurrence of light leakage in the liquid crystal display device shown in FIG. 3.

A liquid crystal display device according to an embodiment of the present invention will now be described with reference to the accompanying drawings.

As is shown in FIG. 1 and FIG. 2, in this embodiment, a color-display-type liquid crystal display device is an active-matrix-type liquid crystal device, which includes a transmissive liquid crystal display panel LPN. The liquid crystal display panel LPN is configured to include an array substrate (first substrate) AR, a counter-substrate (second substrate) CT which is disposed to be opposed to the array substrate AR, and a liquid crystal layer LQ which is held between the array substrate AR and the counter-substrate CT.

In addition, the liquid crystal display device includes a first optical element OD1 which is provided on an outer surface of the array substrate AR (i.e. a surface of the array substrate AR, which is opposed to the other surface thereof that holds the liquid crystal layer LQ), and a second optical element OD2 which is provided on an outer surface of the counter-substrate CT. Further, the liquid crystal display device includes a backlight unit BL which illuminates the liquid crystal display panel LPN from the first optical element OD1 side.

The liquid crystal display panel LPN includes an active area DSP which displays an image, and a light-shield area SLD which surrounds the active area DSP. The active area DSP is composed of a plurality of pixels PX which are arrayed in a matrix of m×n. In this case, m and n are natural numbers.

The array substrate AR is formed by using an insulating substrate 10 having light transmissivity, such as a glass plate. Specifically, the array substrate AR includes, in the active area DSP, an (m×n) number of pixel electrodes EP which are disposed in the respective pixels, an n-number of scanning lines Y (Y1 to Yn) which are extended along the row direction of the pixel electrodes EP, an m-number of signal lines X (X1 to Xm) which are extended along the column direction of the pixel electrodes EP, an (m×n) number of switching elements W which are disposed near intersections of the scanning lines Y and signal lines X in the respective pixels PX.

Each scanning line Y is connected to a scanning line driver YD which is disposed on the array substrate AR or on an external circuit substrate. Each signal line X is connected to a signal line driver XD which is disposed on the array substrate AR or on the external circuit substrate. The scanning line driver YD successively supplies scanning signals (driving signals) to the scanning lines Y. The signal line driver XD supplies video signals (driving signals) to the signal lines X each time the switching elements W of each row are turned on by the scanning signal. Thereby, the pixel electrodes EP in each row are set pixel potentials corresponding to the video signals that are supplied via the associated switching elements W. The scanning line driver YD and signal line driver XD correspond to a voltage applying mechanism which applies a voltage to the pixel electrodes EP.

Each of the switching elements W is composed of, for example, an N-channel-type thin-film transistor. In the array substrate AR, each switching element W includes a semiconductor layer 12 which is disposed on the insulating substrate 10. In this embodiment, the semiconductor layer 12 is formed of polysilicon, but it may be formed of, e.g. amorphous silicon. The semiconductor layer 12 includes a source region 12S and a drain region 12D, between which a channel region 12C is interposed. The semiconductor layer 12 is covered with a gate insulation film 14.

A gate electrode WG of the switching element W is connected to one associated scanning line Y (or formed integral with the scanning line Y). The gate electrode WG and the scanning line Y are both disposed on the gate insulation film 14. The gate electrode WG and scanning line Y are covered with an interlayer insulation film 16.

A source electrode WS and a drain electrode WD of the switching element W are disposed on the interlayer insulation film 16 on both sides of the gate electrode WG. The source electrode WS is connected to one associated signal line X (or formed integral with the signal line X) and is also in contact with the source region 12S of the semiconductor layer 12. The drain electrode WD is connected to one associated pixel electrode EP and is also in contact with the drain region 12D of the semiconductor layer 12. The source electrode WS, drain electrode WD and signal line X are covered with an organic insulation film 18.

The pixel electrode EP is disposed on the interlayer insulation film 16 and is electrically connected to the drain electrode WD. The pixel electrode EP is formed of a light-transmissive electrically conductive material such as indium tin oxide (ITO). The pixel electrode EP, which is disposed in each associated pixel PX, is covered with an alignment film 20.

On the other hand, the counter-substrate CT is formed by using a light-transmissive insulating substrate 30 such as a glass plate. Specifically, the counter-substrate CT includes, in the active area DSP, a color filter 34 which is disposed in association with each pixel. The color filter 34 is formed of colored resins and includes a red color filter 34R formed of a red colored resin, a green color filter 34G formed of a green colored resin, and a blue color filter 34B formed of a blue colored resin. The red color filter 34R is disposed in the red pixel in the active area DSP. Similarly, the green color filter 34G is disposed in the green pixel, and the blue color filter 34B is disposed in the blue pixel.

The counter-substrate CT includes, in the active area DSP, a counter-electrode ET which is disposed so as to cover the color filter layer 34. The counter-electrode ET is disposed to be opposed to the pixel electrodes EP in association with the plural pixels PX. The counter-electrode ET is formed of a light-transmissive electrically conductive material such as ITO. The counter-electrode ET is covered with an alignment film 36.

When the counter-substrate CT and the above-described array substrate AR are disposed such that their alignment films 20 and 36 are opposed, a predetermined gap is provided by spacers (not shown) which are disposed between the alignment films 20 and 36. The liquid crystal layer LQ is composed of a liquid crystal composition including liquid crystal molecules, which is sealed in the gap made between the alignment film 20 of the array substrate AR and the alignment film 36 of the counter-substrate CT.

The paired alignment films 20 and 36 are subjected to rubbing treatment. In the state in which no voltage is applied to the liquid crystal layer LQ, the liquid crystal molecules are aligned, depending on the rubbing directions of these alignment films. The rubbing directions of the paired alignment films 20 and 36 are substantially perpendicular to each other. Liquid crystal molecules in a mid-plane in the liquid crystal layer LQ are aligned substantially perpendicular to the signal line X. The alignment direction of liquid crystal molecules is not limited to this example, and it should suffice if the direction is in the range of between 30° and 90°.

The first optical element OD1 and second optical element OD2 control the polarization state of light which passes therethrough. Specifically, the first optical element OD1 includes a polarizer plate having a transmission axis in a predetermined direction in the major surface thereof, and also having an absorption axis in a direction perpendicular to the transmission axis. The second optical element OD2 includes a polarizer plate having a transmission axis in a predetermined direction in the major surface thereof, and also having an absorption axis in a direction perpendicular to the transmission axis. These polarizer plates are disposed, for example, such that their transmission axes are substantially perpendicular to each other.

Next, a boundary region between the active area DSP and light-shield area SLD is described. As shown in FIG. 3, the color filters 34 (R, G, B), which are disposed in the pixels PX of different colors, are spaced apart from each other, for example, in order to prevent occurrence of non-uniformity in gap of the liquid crystal layer LQ. Thus, a light-shield layer (black matrix) SL is disposed between the pixels PX of the active area DSP. In the light-shield area SLD, like the active area DSP, a light-shield layer SL is disposed. The light-shield layers SL, which are disposed in the active area DSP and light-shield area SLD, can be formed of the same material, such as black-colored resin, in the same fabrication step.

In the light-shield area SLD, for example, in order to secure the same gap as in the active area DSP, color filters 34 (R, G, B) are disposed in the same way as in the active area DSP. In the example shown in FIG. 3, a plurality of color filters 34 (R, G, B) are disposed in the light-shield area SLD with the same pitch as the color filters disposed in the pixels PX of the active area DSP.

The counter-electrode ET extends from the active area DSP to at least a part of the light-shield area SLD, in consideration of misalignment at a time of attaching the array substrate AR and the counter-substrate CT.

As illustrated in FIG. 4, in the liquid crystal display device having the above-described structure, the pixel PX(E), which is disposed at an end portion of the active area DSP, suffers an influence of an oblique electric field which is generated aside from a vertical electric field that is generated in the normal direction of the liquid crystal display panel LPN. The pixel PX(E) disposed at the end portion of the active area DSP corresponds to a pixel having a pixel electrode EP which is connected to a signal line X1 or a signal line Xm of the m-number of signal lines disposed in the active area DSP, or a pixel having a pixel electrode EP which is connected to a scanning line Y1 or a scanning line Yn of the n-number of scanning lines disposed in the active area DSP.

Specifically, each color filter is formed, for example, by patterning a colored resin, and the side surface of the color filter tends to be inclined. In the light-shield area SLD, the color filter (red color filter 34R in FIG. 3 and FIG. 4) that neighbors the active area DSP has an active-area-side end face covered with the counter-electrode ET. In other words, inclined surface of the color filter 34R, which faces the active area side, is covered with the counter-electrode ET.

In this structure, if a potential difference is applied between the pixel electrode EP and counter-electrode ET, an oblique electric field, which is inclined to the normal line of the liquid crystal display panel LPN, is generated in addition to a vertical electric field that is to be normally generated. The oblique electric field is generated between the counter-electrode ET, which covers the color filter 34R disposed in the light-shield area SLD, and the pixel electrode EP of the pixel PX(E) which is disposed at the end portion of the active area DSP. Due to the interaction between the oblique electric field and the vertical electric field, a distortion in electric field occurs, leading to defective alignment of liquid crystal molecules included in the liquid crystal layer LQ in the pixel PX(E) at the end portion of the active area DSP (i.e. a reverse tilt domain is formed).

Figure 5:
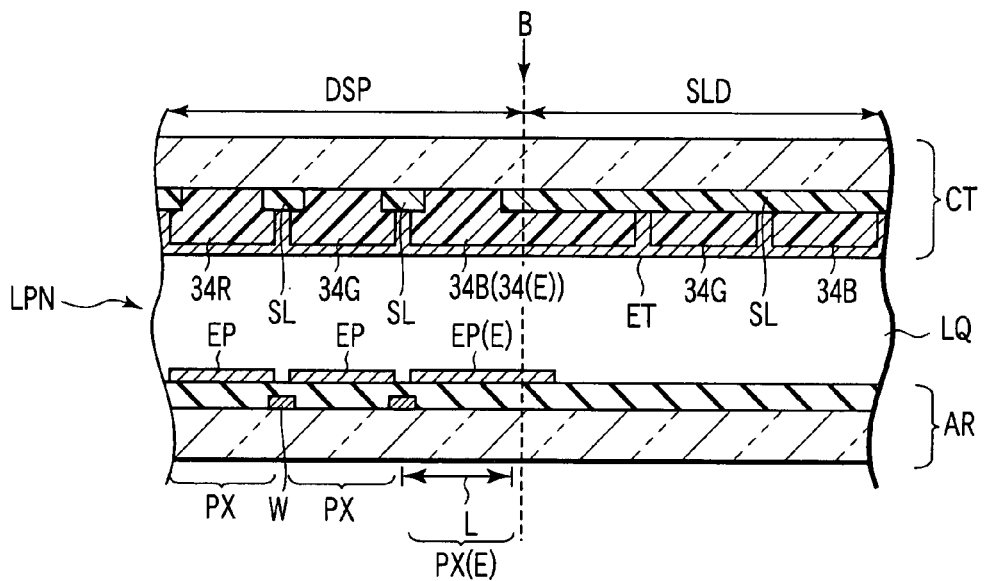
FIG. 5 is a cross-sectional view that schematically shows an example of the structure of the liquid crystal display device according to the embodiment of the present invention.
Figure 6:
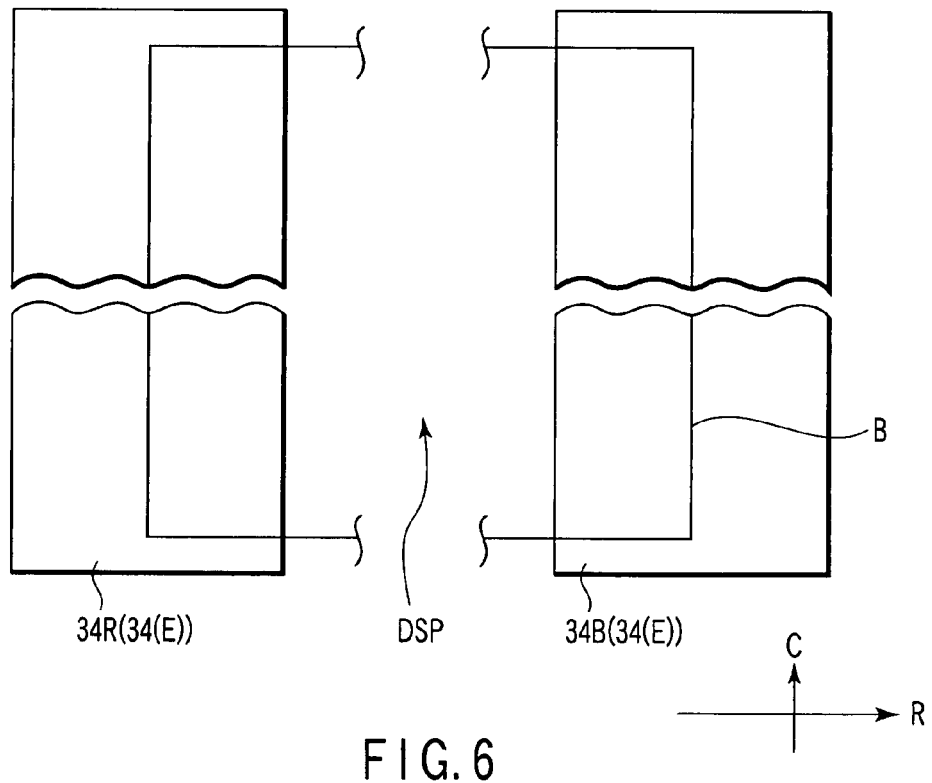
FIG. 6 is a plan view showing an example of the layout of color filters in the example of the structure shown in FIG. 5.

To cope with this problem, in the present embodiment, as shown in FIG. 5 and FIG. 6, a pixel electrode EP(E) and a color filter 34(E) of the pixel PX(E), which is disposed at the end portion of the active area DSP, extend to the light-shield area side beyond a boundary B between the active area DSP and light-shield area SLD.

Specifically, pixels of the same color are arranged in a row direction C in which signal lines X extend, and striped color filters are arranged in association pixel strings comprising these pixels. In the example shown in FIG. 5, the pixels PX(E), which are disposed at one end portion of the active area DSP, are blue pixels. A striped blue color filter 34B (34(E)) extending in the row direction C are disposed in association with the pixel string comprising the blue pixels.

The pixel electrode EP(E), which is disposed in association with the pixel PX(E), is different from pixel electrodes EP disposed in association with other pixels PX with respect to the size and, in particular, the length in a column direction R (i.e. the width of the pixel electrode). The length of the pixel electrode EP(E) is greater than the length L of each pixel in the column direction R (i.e. the width of the pixel). Thus, the pixel electrode EP(E) extends from the active area DSP into the light-shield area SLD beyond the boundary B.

On the other hand, the color filter 34(E), which is disposed in association with the pixel PX(E), is different from color filters disposed in association with other pixels PX with respect to the size and, in particular, the length in the column direction R (i.e. the width of the color filter). The length of the color filter 34(E) is greater than the length L of the pixel. Thus, the color filter 34(E) extends from the active area DSP into the light-shield area SLD beyond the boundary B.

In this example, in the active area DSP, the red pixel string, green pixel string and blue pixel string are arranged in this order along the column direction R. As regards the red pixels of the red pixel string which is disposed at the other end portion of the active area DSP, it is preferable that the pixel electrode and color filter extend to the light-shield area side beyond the boundary between the active area DSP and light-shield area SLD.

As has been described above, since the color filter 34(E), which is disposed in the pixel PX(E) at the end portion of the active area DSP, extends into the light-shield area SLD, a color filter having an inclined active-area-side surface is not disposed in the light-shield area SLD in the vicinity of the active area DSP. It is possible, therefore, to suppress occurrence of an oblique electric field which causes a defect in alignment in the pixel PX(E) at the end portion of the active area DSP.

In the light-shield area SLD, the color filter 34G which is closest to the active area DSP is sufficiently spaced apart from the boundary B. In addition, the pixel electrode EP(E) extends into the light-shield area SLD. Thus, even if an oblique electric field is generated between the inclined surface of the color filter 34G and the pixel electrode EP(E), the influence of the oblique electric field is limited within the light-shield area SLD, and the influence on the active area DSP is reduced. Therefore, occurrence of light leakage at the end portion of the active area can be prevented, and good display quality can be obtained.

In the above-described embodiment, the advantageous effect of reducing the influence of the oblique electric field is enhanced as the width in the column direction R of the pixel electrode EP(E), which is disposed in association with the pixel PX(E), is made greater. However, if the width of the pixel electrode EP(E) exceeds 1.5 times the pixel width L, the difference in capacitance between the pixel electrode EP(E) and a pixel electrode disposed in another pixel increases excessively, leading to defective display. It is thus preferable to set the width along the column direction R of the pixel electrode EP(E), which is disposed in association with the pixel PX(E), at 3×L/2, or less. According to the inventor's study, it was confirmed that if the width along the column direction R of the pixel electrode EP(E) is 5×L/4, or more, the advantageous effect of sufficiently reducing the influence of the oblique electric field can be obtained.

On the other hand, the advantageous effect of reducing the influence of the oblique electric field is enhanced as the width along the column direction R of the color filter 34(E), which is disposed in association with the pixel PX(E), is made greater. In this embodiment, the width of the color filter 34(E) is set at about three times the pixel width L.

Next, another embodiment of the present invention will now be described.

Figure 7:
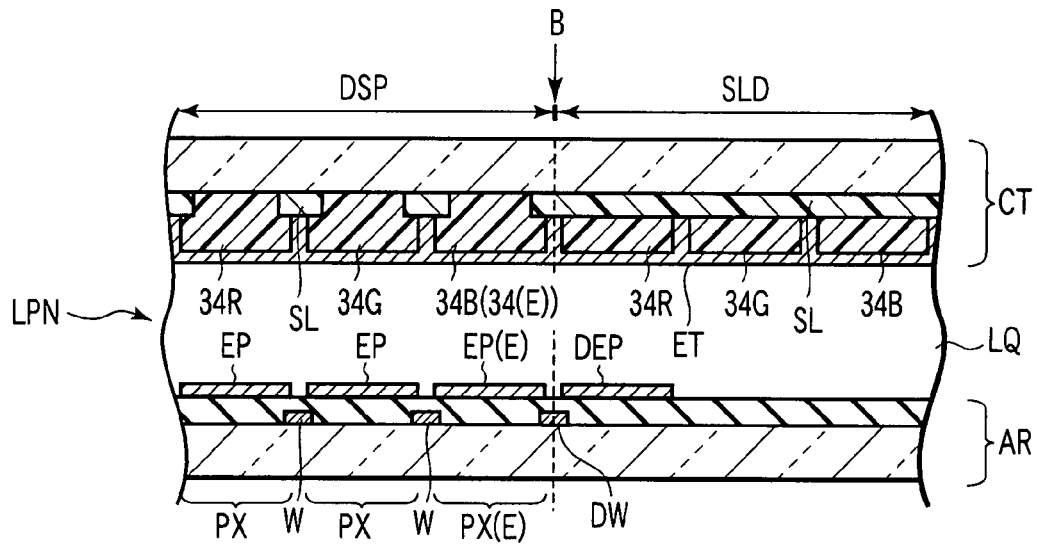
FIG. 7 is a cross-sectional view that schematically shows an example of the structure of a liquid crystal display device according to another embodiment of the present invention.

As shown in FIG. 7, the liquid crystal display panel LPN includes, in addition to the pixels PX disposed in the active area DSP, a dummy pixel DPX which is disposed in the light-shield area SLD so as to neighbor the end portion of the active area DSP.

The array substrate AR includes, in addition to the pixel electrodes EP disposed in the respective pixels PX of the active area DSP, a dummy pixel electrode DEP which is disposed in the dummy pixel DPX of the light-shield area SLD. The dummy pixel electrode DEP is disposed in the light-shield area SLD in association with the region of at least one pixel neighboring the active area DSP.

The counter-substrate CT includes striped color filters 34 (R, G, B) extending in the respective row direction in the active area DSP and light-shield area SLD. In addition, the counter-substrate CT includes a counter-electrode ET which is disposed so as to cover the color filters 34 (R, G, B). The counter-electrode ET is so disposed as to be opposed to at least the pixel electrodes EP and dummy pixel electrode DEP.

Figure 8:
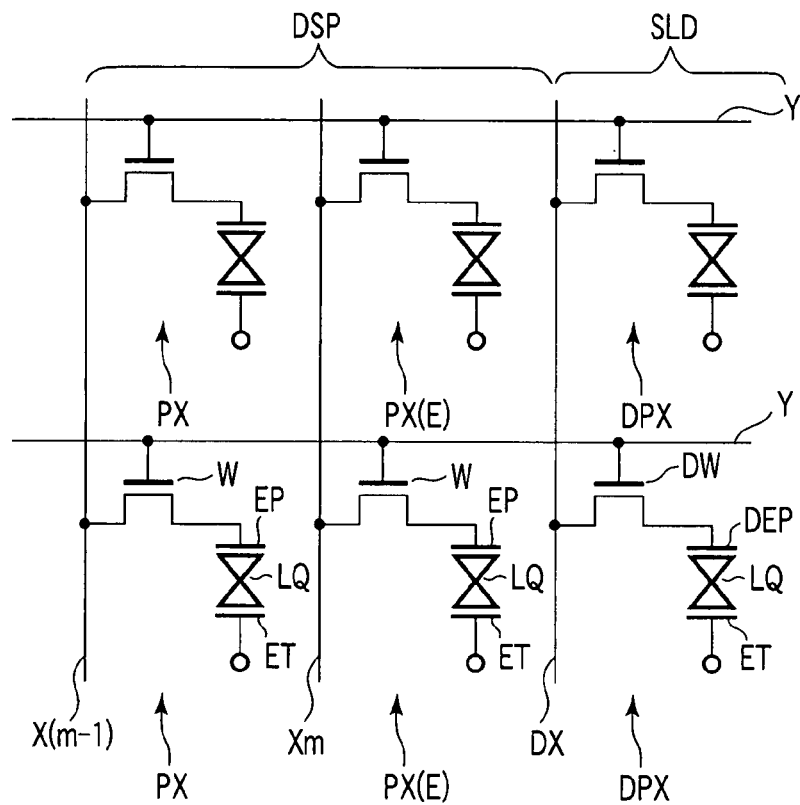
FIG. 8 is a view for describing a circuit configuration in the example of the structure shown in FIG. 7.

A voltage is applied to the dummy pixel electrode DEP, like the pixel electrodes EP disposed in the pixels PX of the active area DSP. Specifically, as shown in FIG. 8, the dummy pixel electrode DEP has the same structure as the pixel electrode EP, and is connected to a dummy switching element DW. The dummy switching element DW has the same structure as the switching element W. The dummy switching element DW has a gate electrode WG connected to the associated scanning line Y, and a source electrode WS connected to a dummy signal line DX. The dummy signal line DX, like the signal lines X, is connected to the signal line driver XD.

In this structure, the scanning line driver YD successively supplies scanning signals. On the other hand, the signal line driver XD supplies video signals (driving signals) to the m-number of signal lines X and at least one dummy signal line DX each time the switching elements W and dummy switching element DW of each row are turned on by the scanning signal. The scanning line driver YD and signal line driver XD correspond to a voltage applying mechanism which applies a voltage to the dummy pixel electrodes DEP. Thereby, the pixel electrodes EP and dummy pixel electrode DEP in each row are set at pixel potentials corresponding to the supplied video signals.

Since the voltage is applied to the dummy pixel electrode DEP disposed in the light-shield area SLD, similarly to the pixel electrodes EP in the active area DSP, an oblique electric field is hardly generated between the pixel electrode EP(E) and counter-electrode ET in the pixel PX(E) at the end portion of the active area DSP. Moreover, even if an oblique electric field is generated between the dummy pixel electrode DEP and counter-electrode ET, the pixels of the active area DSP, even the pixel PX(E) disposed at the end portion of the active area DSP, are hardly affected by the oblique electric field. Therefore, occurrence of light leakage at the end portion of the active area can be prevented, and good display quality can be obtained.

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

What is claimed is:

1. An active matrix type liquid crystal display device including an active area which is composed of first pixels arrayed in a matrix and second pixels disposed at both end portions thereof, and a light-shield area surrounding the active area, comprising:
    a first substrate including first pixel electrodes disposed in the respective first pixels and second pixel electrodes disposed in the respective second pixels, each of the second pixel electrodes being wider than each of the first pixel electrodes;
    a second substrate including first color filters corresponding to and disposed in the respective first pixels, second color filters disposed in the respective second pixels, each of the second color filters being wider than each of the first color filters, a light-shield layer disposed in the light-shield area, and a counter-electrode which is disposed to cover the first color filters and the second color filters and extends from the active area to at least a part of the light-shield area; and
    a liquid crystal layer held between the first substrate and the second substrate,
    wherein the second pixel electrodes and the corresponding second color filters extend into the light-shield area.

2. The liquid crystal display device according to claim 1, wherein a width of the second pixel electrode is greater than a width of each pixel, and set at 3×L/2, or less, where L is the width of each pixel.

3. The liquid crystal display device according to claim 1, wherein a width of the second pixel electrode is set at 5×L/4, or more, where L is a width of each pixel.

* * * * *